United States Patent [19]

Abler et al.

[11] Patent Number: 5,656,768

[45] Date of Patent: Aug. 12, 1997

[54] METHOD FOR DETERMINING THE MOMENT OF INERTIA

[75] Inventors: Georg Abler; Johann Eitzinger; Klaus-Christoph Harms, all of Graz, Austria

[73] Assignee: AVL Gesellschaft fur Verbrennungskraftmaschinen und Messtechnik m.b.H. Prof. Dr.h.c. Hans List, Graz, Austria

[21] Appl. No.: 535,845

[22] Filed: Sep. 28, 1995

[51] Int. Cl.$^6$ .................. G01M 1/100; G01M 1/16; G01M 1/38

[52] U.S. Cl. .............................. 73/65.07; 73/460

[58] Field of Search ................. 73/65.01, 65.02, 73/65.03, 65.04, 65.05, 65.06, 65.07, 65.08, 65.09, 457, 460

[56] References Cited

U.S. PATENT DOCUMENTS

| | | | |
|---|---|---|---|
| 3,905,223 | 9/1975 | Ludloff | 73/65.07 |
| 4,036,049 | 7/1977 | Hanson | 73/65.01 |
| 4,644,792 | 2/1987 | Fietzke | 73/65.09 |
| 5,157,965 | 10/1992 | Koegeler et al. | |
| 5,481,912 | 1/1996 | Himmler | 73/460 |

FOREIGN PATENT DOCUMENTS

| | | |
|---|---|---|
| 0199431 | 10/1986 | European Pat. Off. . |
| 0434665 | 6/1991 | European Pat. Off. . |
| 0476588 | 3/1992 | European Pat. Off. . |

Primary Examiner—Richard Chilcot
Assistant Examiner—Max H. Noori

[57] ABSTRACT

For largely automatic determination of the moment of inertia of, in particular, an internal combustion engine on a testing stand, speed n and indicated torque $M_M$ are measured under controlled operating conditions in both a run-up phase as well as in a coasting phase. In order to eliminate the loss moment in the determination of the moment of inertia, the measuring points of the respectively same speed from the run-up phase and the coasting phase are interpreted in combination, this enabling an exact determination of the moment of inertia in a very simple way with the devices that are usually already present at a testing stand.

14 Claims, 2 Drawing Sheets

$$I = (15/pi) * (L_2 - L_1)/(n_o - n_u)$$

$I = (15/pi) * (L_2 - L_1)/(n_o - n_u)$

METHOD FOR DETERMINING THE MOMENT OF INERTIA

BACKGROUND OF THE INVENTION

The invention is directed to a method for determining the moment of inertia of at least an element of a drive train of a vehicle, particularly of an internal combustion engine on a testing stand, whereby the observed torque ($M_M$) is corrected according to the equation: $M=M_M+M_V$ by the loss moment ($M_V$) effective at the time, and the moment of inertia is determined from the corrected torque M and the angular acceleration $\dot{n}$ according to the equation $I=M \cdot (30/\pi \dot{n})$ or equivalent quantities.

In this context, the exact value of the moment of inertia is an important but often only inadequately known quantity. The determination thereof is of relatively great significance for research and development, and also, for example, for error diagnosis and maintenance, especially in conjunction with internal combustion engines for vehicles. In various other contexts it is also of interest to know the moment of inertia of a gearing alone or of combined elements of a drive train. Obtaining the moment of inertia can also be important for research and development.

For example, knowledge of the moment of inertia is of particular significance for the design of the connecting shaft between an internal combustion engine to be tested and the testing stand and for the parameterization of the testing stand or control circuits. In this context, incorrectly assumed moments of inertia can lead to poor control and regulating behavior of the testing stand or can even lead to operating malfunctions due to breakage of the shaft as a result of dynamic overload. Knowledge of the moments of inertia is also important, for example, considering large ship engines since, in particular, the elastic bearing of the motor must be designed for the reaction moments of the motor that occur during the start-up procedure.

In this context, for example, EP-A-434 665 discloses that the unknown moment of inertia be determined as: $I_o=I_1 \cdot \dot{w}_1/(\dot{w}_o-\dot{w}_1)$ from a measurement of the angular acceleration with and without known supplemental moment of inertia. In order to manage without a known supplemental moment of inertia, Newton's known law (force=mass×acceleration) for the motion of revolution is utilized as the determining context for the calculation of the moment of inertia. Accordingly, the moment of inertia I can be determined as: $I=M \cdot (30/\pi \dot{n})$ as quotient of the measurable quantities of torque (M) [Nm] and angular acceleration ($\dot{n}$) [min$^{-1}$/sec], whereby averaging can be carried out as needed over a number of rotational cycles for eliminating the superimposed torsional oscillations and rotational inequalities. This simple relationship, however, is only valid for the absolute loss-free case. In order to take the losses determined by various causes into consideration, the measured torque ($M_M$) or, respectively, the indicated torque ($M_M$) or, respectively, the torque ($M_M$) that can be identified in some way or other must be corrected by the loss moment ($M_V$) effective at the time (the frictional moment ($M_R$) in the simplest case) according to: $M=M_M+M_V$ where M is the corrected torque.

According to the prior art known in this context, the frictional moment or the frictional power is determined at, for example, the motor testing stand, for example in drag operation with respectively constant speed or in coasting with different centrifugal masses such as balance weights. What is referred to as friction characteristic in this context is the dependency of the frictional moment identified in this way on the rpm. In these known methods, the frictional moment is in fact generally assumed to be rpm-dependent but, however, essentially constant for the duration of the measurement. Since, however, it is dependent on many different influencing variables, for example on the oil temperature that generally changes during the measurement, such methods and their application to the determination of the moment of inertia involve great errors.

EP-A-199 431, for example, is relevant in this context. According to this document, the momentary frictional moment can be determined, for example, from the indicated cylinder pressure and the rpm curve, whereby the oscillating and the rotating moment of inertia are assumed to be known. A reversal of this method for determining the moment of inertia itself, however, is not practical. In the case of an electric motor running practically friction-free, further, it is known from, for example, EP-A-476 588 to determine the moment of inertia I from an acceleration phase (positive or negative) according to: $I=\int M \, dt/\Delta w$ by integration of the measured torque (M) and division by the speed difference ($\Delta w$).

SUMMARY OF THE INVENTION

It is an object of the invention to improve a method of determining moment of inertia such that the moment of inertia of the unit under test can be largely automatically determined without estimates or simplifications which can cause additional errors having to be compensated therefor. It is an object that the moment of inertia can be determined without additional, involved measures having to be undertaken, for example, at a known motor testing stand.

This object is inventively achieved by a method of the present invention in that both indicated torque ($M_M$) as well as angular acceleration ($\dot{n}$) are determined, on the one hand, in a run-up phase with positive rotational acceleration and, on the other hand, in a coasting phase with negative rotational acceleration under operating conditions of the element to be investigated (the unit under test) that are otherwise the same; and in that the values of run-up phase and coasting phase that correspond to one another in terms of speed and represent $M_M$ and $\dot{n}$ are respectively subtracted from one another for eliminating the loss moment and other disturbing quantities and the difference values that are obtained are utilized for determining the moment of inertia.

By combining two respective measured values at the same speed, the loss moment does not appear explicitly anywhere and, differing from the known methods, need not therefore be separately identified in order to be able to correct the torque measured during an acceleration test. The possibility therefore derives of implementing the entire measurement within a short time (a number of seconds), with the advantage that influencing variables such as the oil temperature, which can falsify the result in the known methods, can be neglected. Further, this method can be automated more easily compared to the known methods because it implements all necessary measurements in one pass, whereas at least two measuring phases (registration of the friction characteristic, acceleration test) or even structural modifications between the measurements (mounting the supplemental inertias) are required according to the prior art tests.

Linear speed ramps of identical duration—and, thus, the same rotational acceleration in terms of amount—between a lower ($n_u$) and an upper speed barrier ($n_o$) are preferred. The curve of the speed and of the torque over time are determined and evaluated. Given a data acquisition referred to rotational angle, the relationships between time and rotational angle must be applied as usual.

The elimination of the frictional moment in the determination of the moment of inertia can now ensue such that the measuring points of the respectively same speed are evaluated and, for example, averaged from run-up curve or curves and the coasting curve or curves.

$$I=(15/\pi)\cdot(M_{M+}-M_{M-})/\dot{n}$$

The elimination of the loss moment or frictional moment in the determination of the moment of inertia, however, preferably ensues such that the time integrals of the torque curves measured in the controlled run-up and coasting are formed and the average rotational pulses obtained in this way are evaluated.

$$I=(15/\pi)\cdot(\int M_{M+}dt - \int M_{M-}dt)/(n_o-n_u)$$

In order to avoid the influence of transients at the beginning and at the end of every speed ramp, it is advantageous when the integrals are not formed from the beginning to the end of every controlled run-up or coasting but are only formed in a time interval lying therebetween. This time interval can be defined by predetermined time values or, preferably, by predetermined speed thresholds.

A testing stand for controlling the speed ramps and for measuring speed and torque or power is advantageous for the implementation of the method given internal combustion engines. It can be applied in fired mode given internal combustion engines but, preferably, can also be implemented in an exclusively dragged mode.

The calculated moment of inertia (I), of course, is composed of the moment of inertia ($I_x$) of the unit under test, the moment of inertia ($I_o$) of the testing stand and the moment of inertia ($I_w$) of the connecting shaft. Whereas ($I_w$) the moment of inertia of the connecting shaft is generally indicated by the manufacturer of the shaft or can be identified with known methods of machine dynamics, the moment of inertia ($I_o$) of the testing stand without the unit under test and the connecting shaft can also be determined according to the same method as the overall moment of inertia I. What is therefore obtained as final result is:

$$I_x=I-I_w-I_o$$

It has proven that there are optimum speed ramps for specific internal combustion engines and testing stands at which the error in the moment of inertia becomes minimum. In order to find such an optimum ramp given predetermination of the allowable upper and lower speed, it is proposed that, first, a shortest ramp duration at which the determination of the intrinsic moment of inertia of the testing stand still lies within acceptable error limits and that is dependent on the testing stand and its mechanical, electrical, mensurational and control-oriented devices be identified and that, second, the shortest ramp duration at which no upward transgression of the allowable mechanical and mensurational limit values occurs and that is also dependent on the unit under test and on the connecting shaft be identified. The respectively longer of the two shortest ramp durations identified in this way is also the optimum.

It should be additionally noted that the dwell time at high speeds is to be fundamentally kept as short as possible.

On the other hand, the inventive method, of course, can be analogously employed for the determination of the loss moments or of the frictional moments or of the frictional power. To that end, the torques M or, respectively, rotational pulses $\int M\,dt$ of run-up and coasting should not be subtracted but added, so that the influence of the inert masses is eliminated.

As described, the method of the invention is not limited to employment at internal combustion engines and can be utilized at the greatest variety of testing stands or diagnostic testing equipment, even where, for example, only a gearing without motor or a hybrid drive with an electric motor is to be investigated. As described, it is not only the frictional moment but also certain disturbing quantities of the measuring chain, for example a DAC offset, that can be eliminated, this being very advantageous in the determination of moment of inertia.

It becomes clear to a person skilled in the art based on the above comments that the dynamic frictional moment, of course, can also be simply determined by an appropriate application of this method when, conversely, the moment of inertia is already exactly known. Exact knowledge of the moment of inertia is also required, for example, in conjunction with dynamic power measurement at internal combustion engines or, respectively, entire drive trains of motor vehicles in workshops.

For the sake of completeness, it should also be pointed out here that it is of no significance for the purpose of implementing the method of the invention whether the torques, speeds and angular accelerations are directly measured or, on the other hand, are known by predetermination or setting; of course, combinations of known or set values with measured values or the indirect determination from other values known at the testing stand are also possible.

DETAILED DESCRIPTION OF THE PREFERRED EMBODIMENTS

Figure 1:
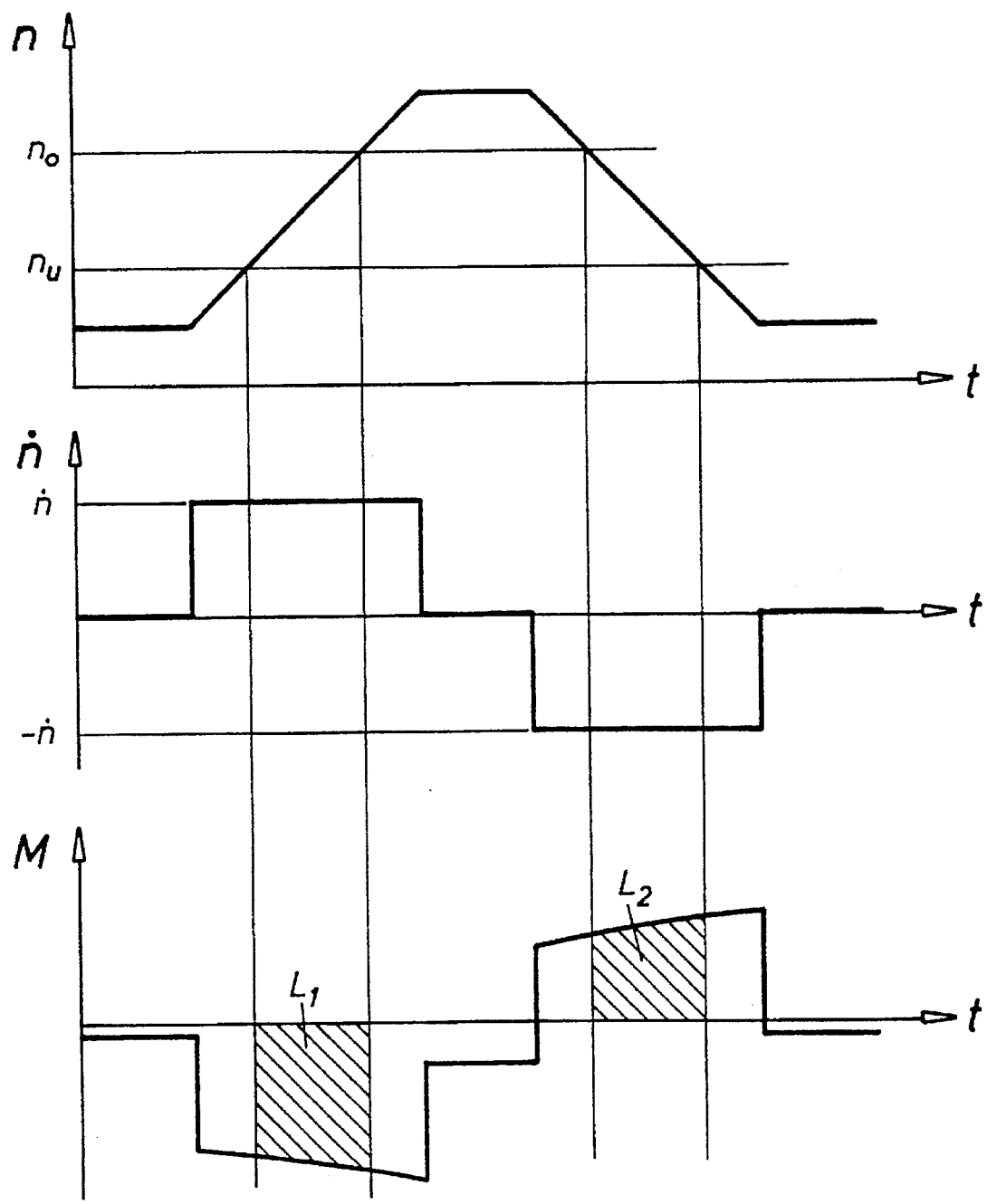
FIG. 1 is a graphical diagram of the idealized curves of speed n, angular acceleration $\dot{n}$ and torque M over the time t when controlled speed ramps are implemented at a testing stand for the internal combustion engine to be tested.

FIG. 1 serves the purpose of explaining a version of the inventive method. The torque curve corresponds to a unit under test having a loss moment that disproportionately rises with the speed. The areas $L_1$ (negative) and $L_2$ represent the integrals over the torque, whereas the speed lies between $n_u$ and $n_o$. The two areas supplement each other to twice the change in rotational pulse that the rotating parts experience when they are accelerated from $n_u$ to $n_o$. This total area is independent of the loss moment of the unit under test.

Figure 2:
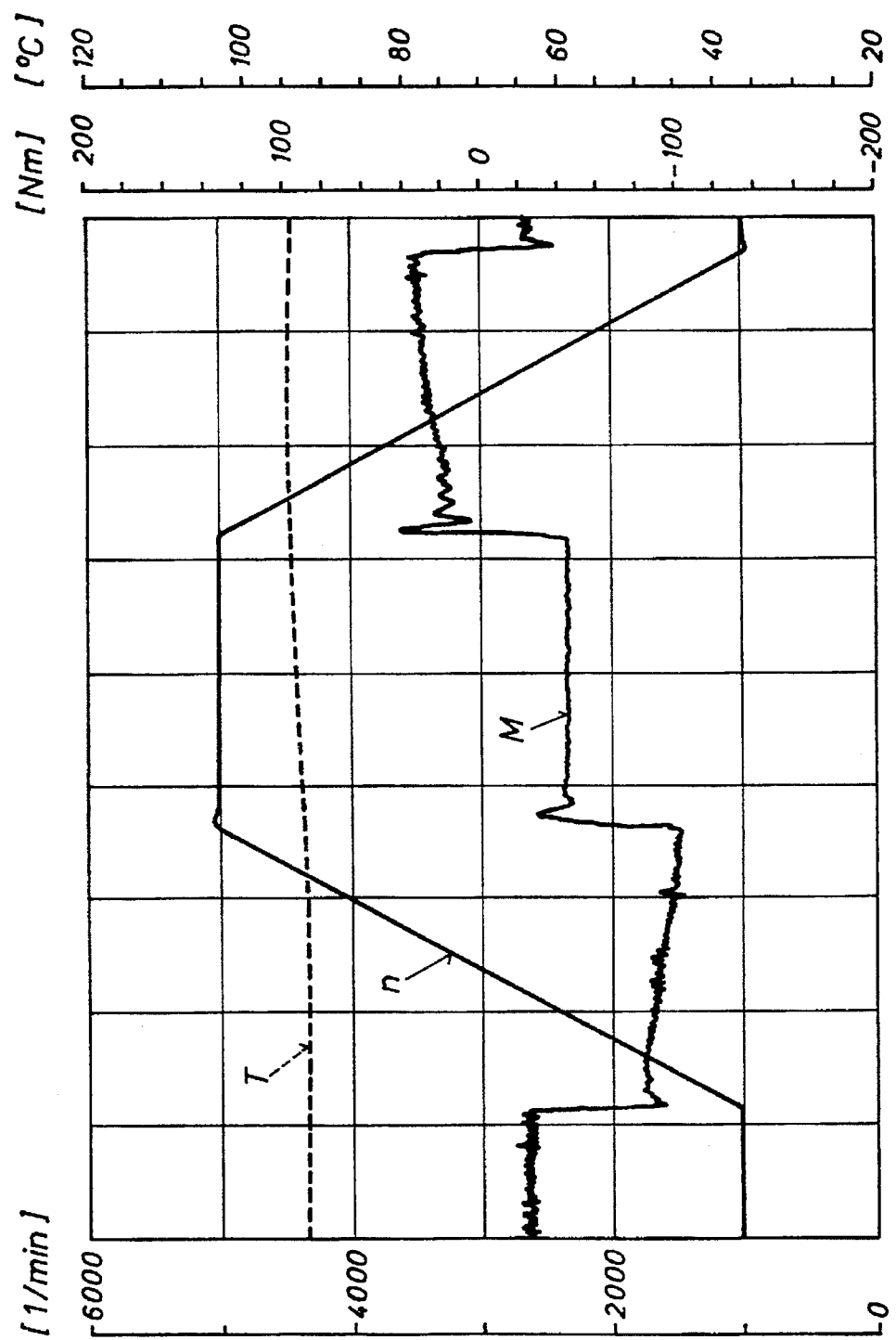
FIG. 2 is a graphical diagram of correspondingly typical, measured curves of speed n, torque M and oil temperature T over the time t.

FIG. 2 shows signal curves measured at the motor testing stand. One can clearly see the transients of torque and speed that can deteriorate the precision of the calculated moment of inertia and that are therefore not interpreted here. In this example, the intervals between 2000 min$^{-1}$ and 4000 min$^{-1}$ were taken into consideration ($n_u$=2000 min$^{-1}$, $n_o$=4000 min$^{-1}$). One can also see the rise of the loss moment with the speed and the relatively great change in the oil temperature during the waiting time of 5 s at 5000 min$^{-1}$. This waiting time, of course, is not meaningful for the implementation of the method and only serves the purpose here of illustrating the change in the operating conditions of the internal combustion engine. The influence of this change is expressed in the result for the moment of inertia. The test should therefore be implemented in the shortest possible time.

A compilation of the mathematical conditional equations that are critical in conjunction with the inventive method also follows for further elucidation.

| | |
|---|---|
| Speed: | $n[\text{min}^{-1}]$ (average rpm) |
| Angular acceleration: | $\dot{n}[\text{min}^{-1}/\text{sec}]$ |
| | (change in speed per second) |
| Overall structure: | Unit(P) under test + |
| | shaft (W) + load machine (B) |
| Overall moment of inertia: | $I = I_P + I_W + I_B$ |
| Torque-disturbing quantities: | $M_S(n) = M_1(n) + M_2$ |
| Torque (run-up): | $M_+(n) = (\pi/30) \cdot I \cdot \dot{n}_+(n) + M_S(n)$ |
| Torque (coasting): | $M_-(n) = (\pi/30) \cdot I \cdot \dot{n}_-(n) + M_S(n)$ |
| Version A: | |
| For 1 value pair given n: | |
| $I_n = (30/\pi) \cdot [M_+(n) - M_-(n)]/[\dot{n}_+(n) - \dot{n}_-(n)]$ | |
| When: $\dot{n}_+(n) = -\dot{n}_-(n) = \dot{n}(n)$, whereby, potentially, | |
| $\dot{n}(n) = \dot{n} = \text{const.}$ | |
| then: $I_n = (15/\pi) \cdot [M_+(n) - M_-(n)]/\dot{n}(n)$ | |
| Averaging: $I = (I_{n1} + I_{n2} + \ldots)/\text{plurality}$ | |
| Result: $I_P = I - I_W - I_B$ | |
| Version B: | |
| Rotational pulse (run-up): $L_+ =$ | |

$$\int_{t_+(n_u)}^{t_+(n_o)} M_+(n)dt = (\pi/30) \cdot I \cdot (n_o - n_u) + L_{s+}$$

Rotational pulse (coasting):

$$L_- = \int_{t_-(n_o)}^{t_-(n_u)} M_-(n)dt = (\pi/30) \cdot I \cdot (n_u - n_o) + L_{s-}$$

When: $\dot{n}_+(n) = -\dot{n}_-(n) = \dot{n}(n)$, whereby, potentially,
$\dot{n}(n) = \dot{n} = \text{const.}$
then: $L_{s+} = L_{s-}$
and: $I = (15/\pi) \cdot (L_+ - L_-)/(n_o - n_u)$
Result: $I_P = I - I_W - I_B$ Although the present invention has been described with reference to a specific embodiment, those of skill in the art will recognize that changes may be made thereto without departing from the scope and spirit of the invention as set forth in the appended claims.

I claim as my invention:

1. A method for determining a moment of inertia of at least an element of a drive train of a vehicle, by rotating the element via a testing stand, whereby an indicated torque ($M_M$) is corrected by a loss moment ($M_V$) effective at the time to derive a corrected torque (M) such that: $M = M_M + M_V$ and the moment of inertia (I) according to $I = M \cdot (30/\pi \dot{n})$ is determined from the corrected torque (M) and an angular acceleration $\dot{n}$ comprising the steps of:

determining ($M_M$) and ($\dot{n}$) by rotating the element in a run-up phase with positive rotational acceleration and in a coasting phase with negative rotational acceleration;

determining representative values of run-up phase and coasting phase that correspond to one another in terms of speed and represent $M_M$ and $\dot{n}$;

subtracting the determined representative values of run-up phase from the determined representative values of coasting phase for eliminating the loss moment $M_V$; and obtaining a difference in the determined representative values and utilizing the difference in values for determining the moment of inertia.

2. The method according to claim 1, wherein the positive and negative rotational accelerations in the run-up and coasting phases are kept the same in terms of amount given the respectively same speeds.

3. The method according to claim 2, wherein the run-up phase and coasting phase are implemented as speed ramps with the same, predetermined amount of the rotational acceleration.

4. The method according to claim 1, wherein the resultant difference of $M_M$ is divided by the resultant difference of $\dot{n}$ in the determination of I.

5. The method according to claim 2, wherein time integrals of $M_M$ are formed as said representative values over the run-up and coasting phase.

6. The method according to claim 5, wherein the integration duration is respectively fixed by the passing of predetermined limit speeds; and in that the time integrals are divided by the difference between said speeds in the determination of I.

7. The method according to claim 1 wherein the element is connected by a connecting shaft to the testing stand and a sought moment of inertia $I_X$ of the element of the drive train alone is determined from the moment of inertia I of the element, connecting shaft and testing stand together according to $I_X = I - I_W - I_O$, whereby the moment of inertia $I_W$ of a connecting shaft is predetermined and the moment of inertia $I_O$ of a testing stand by itself is determined by:

determining ($M_M$) and ($\dot{n}$) by rotating the testing stand by itself in a run-up phase with positive rotational acceleration and in a coasting phase with negative rotational acceleration;

determining representative values of run-up phase and coasting phase that correspond to one another in terms of speed and represent $M_M$ and $\dot{n}$;

subtracting the determined representative values of run-up phase from the determined representative values of coasting phase for eliminating the loss moment $M_V$; and obtaining a difference in the determined representative values and utilizing the difference in values for determining the moment of inertia.

8. The method according to claim 7, wherein the run-up phase and coasting phase are implemented as linear speed ramps with equal magnitude rotational acceleration, wherein first, a shortest ramp duration of the linear speed ramps at which the determination of the moment of inertia $I_o$ of the testing stand still lies within acceptable error limits and that is dependent on the testing stand is identified, and that, second, the shortest ramp duration at which no upward transgression of predetermined allowable mechanical and measurational limit values occurs and that is also dependent on the element of the drive train and on the connecting shaft is identified; and in that the respectively longer of these ramp durations is employed to optimize the linear speed ramps.

9. A method for determining a moment of inertia of a rotating element comprising the steps of:

rotating the element with a positive rotational acceleration during a run-up phase;

during the run-up phase with the positive rotational acceleration, measuring torque and angular acceleration as a function of speed and time;

allowing the element to coast with negative rotational acceleration during a coasting phase;

during the coasting phase, measuring torque and angular acceleration with regard to speed and time;

for a particular speed range, determining a first and a second value for torque during the run-up phase and the coasting phase respectively and a third and a fourth value for angular acceleration during the run-up phase and the coasting phase respectively; and obtaining the difference between the first and second values for torque during the run-up and the coasting phases and the difference in the third and fourth values of angular acceleration during the run-up phase and the coasting phase, and using these differences in values for determining the moment of inertia of the element.

10. The method according to claim 9, wherein the positive and negative rotational accelerations in the run-up and coasting phases are undertaken equal in magnitude at said speed range.

11. The method according to claim 10, wherein the angular acceleration in the run-up phase and coasting phase are kept constant in magnitude.

12. The method according to claim 9, wherein said difference in values for said torque are divided by said difference in values of said angular acceleration in the determination of moment of inertia of the rotating element.

13. The method according to claim 9, wherein said values of torque are formed as time integrals of measured torque during the run-up and coasting phases.

14. The method according to claim 13, wherein the integration duration is respectively fixed by the passing of predetermined limit speeds; and the time integrals are divided by the difference between said limit speeds in the determination of said moment of inertia of the rotating element.

* * * * *